(12) United States Patent
Yokoyama et al.

(10) Patent No.: US 10,634,042 B2
(45) Date of Patent: Apr. 28, 2020

(54) ROTATING MACHINE AND METHOD FOR MANUFACTURING CASING FOR ROTATING MACHINE

(71) Applicant: MITSUBISHI HEAVY INDUSTRIES ENGINE & TURBOCHARGER, LTD., Sagamihara-shi, Kanagawa (JP)

(72) Inventors: Takao Yokoyama, Tokyo (JP); Hiroshi Suzuki, Tokyo (JP); Yosuke Dammoto, Tokyo (JP); Tadashi Kanzaka, Tokyo (JP); Atsushi Takita, Tokyo (JP)

(73) Assignee: MITSUBISHI HEAVY INDUSTRIES ENGINE & TURBOCHARGER, LTD., Sagamihara-Shi (JP)

( * ) Notice: Subject to any disclaimer, the term of this patent is extended or adjusted under 35 U.S.C. 154(b) by 84 days.

(21) Appl. No.: 16/082,866

(22) PCT Filed: Mar. 18, 2016

(86) PCT No.: PCT/JP2016/058804
§ 371 (c)(1),
(2) Date: Sep. 6, 2018

(87) PCT Pub. No.: WO2017/158837
PCT Pub. Date: Sep. 21, 2017

(65) Prior Publication Data
US 2019/0093550 A1     Mar. 28, 2019

(51) Int. Cl.
*F01D 25/26*         (2006.01)
*F02B 39/00*         (2006.01)
(Continued)

(52) U.S. Cl.
CPC ............ *F02B 39/00* (2013.01); *B23K 26/342* (2015.10); *B23P 15/26* (2013.01); *F01D 25/145* (2013.01);
(Continued)

(58) Field of Classification Search
None
See application file for complete search history.

(56) References Cited

U.S. PATENT DOCUMENTS 5,704,759 A  *  1/1998  Draskovich ............. F01D 11/12
                                              415/170.1
5,980,203 A     11/1999  Zatorski et al.
(Continued)

FOREIGN PATENT DOCUMENTS

| JP | 2001-234753 A | 8/2001 |
| JP | 2007-154750 A | 6/2007 |
| JP | 2007-198137 A | 8/2007 |

OTHER PUBLICATIONS

International Search Report (Form PCT/ISA/210) for International Application No. PCT/JP2016/058804, dated May 24, 2016, with English translation.
(Continued)

*Primary Examiner* — Michael Lebentritt
(74) *Attorney, Agent, or Firm* — Birch, Stewart, Kolasch & Birch, LLP

(57) ABSTRACT

A rotating machine includes a rotating body configured to rotate around a central axis, and a casing configured to accommodate at least a part of the rotating body, and the casing, includes a main section made of a metallic material, and a high-porosity section made of the same material as the main section and having a porosity higher than the main section.

7 Claims, 6 Drawing Sheets

(51) Int. Cl.
*F04D 29/02* (2006.01)
*F02C 6/12* (2006.01)
*F04D 29/42* (2006.01)
*B23K 26/342* (2014.01)
*B23P 15/26* (2006.01)
*F01D 25/14* (2006.01)
*F02B 37/00* (2006.01)
*B23K 101/00* (2006.01)

(52) U.S. Cl.
CPC .............. *F01D 25/26* (2013.01); *F02B 37/00* (2013.01); *F02C 6/12* (2013.01); *F04D 29/023* (2013.01); *F04D 29/4206* (2013.01); *B23K 2101/001* (2018.08); *F05D 2220/40* (2013.01); *F05D 2260/231* (2013.01); *F05D 2300/5024* (2013.01); *F05D 2300/514* (2013.01)

(56) References Cited

U.S. PATENT DOCUMENTS

| | | | |
|---|---|---|---|
| 2016/0047255 A1* | 2/2016 | Vargas | F02C 3/10 60/805 |
| 2016/0123327 A1* | 5/2016 | Collins | F04C 29/04 418/201.2 |
| 2016/0130969 A1* | 5/2016 | Gold | F01D 11/001 415/173.4 |
| 2016/0332371 A1* | 11/2016 | Staroselsky | B22F 5/04 |

OTHER PUBLICATIONS

Written Opinion of the International Searching Authority (Form PCT/ISA/237) for International Application No. PCT/JP2016/058804, dated May 24, 2016, with English translation.

* cited by examiner

ROTATING MACHINE AND METHOD FOR MANUFACTURING CASING FOR ROTATING MACHINE

TECHNICAL FIELD

The present invention relates to a rotating machine, and a method for manufacturing a casing for the rotating machine.

BACKGROUND ART

For example, as disclosed in Patent Document 1, in many cases, a casing for forming an outer shell of a rotating machine, such as a compressor casing of a turbocharger, is made of an aluminum alloy and is formed by casting or die casting. An aluminum alloy has a light weight, a low cost, and high thermal conductivity.

CITATION LIST

Patent Literature

[Patent Document 1]
Japanese Unexamined Patent Application, First Publication No. 2001-234753

SUMMARY OF INVENTION

Technical Problem

In the turbocharger described in Patent Document 1, the temperature and pressure of air rises by an impeller. At this time, since the compressor casing is made of a material having high thermal conductivity, there is a possibility that the heat of the air heated by the impeller is transferred to the intake air via the compressor casing. When the heat is transferred to the intake air in this manner, the intake air temperature rises and the compression performance of the centrifugal compressor deteriorates.

In the turbocharger, heat of exhaust gas in the turbine is released from the turbine casing made of a material with high thermal conductivity. Hereupon, the turbine output deteriorates.

An object of the present invention is to provide a rotating machine and a method of manufacturing a casing for the rotating machine capable of suppressing the heat transfer via the casing and improving the performance of the rotating machine.

Solution to Problem

According to a first aspect of the present invention, there is provided a rotating machine including: a rotating body configured to rotate around a central axis, and a casing configured to accommodate at least a part of the rotating body. The casing includes a main section made of a metallic material, and a high-porosity section made of the same material as the main section and having a porosity higher than the main section.

According to such a configuration, since the high-porosity section has a high porosity in contrast to the main section of the casing, the thermal conductivity decreases. By partially providing such a high-porosity section, it is possible to use the main section to main the necessary rigidity, while partially controlling the thermal conductivity of the casing.

According to a second aspect of the present invention, in the rotating machine according to the first aspect, the high-porosity section may have a cavity.

In this way, by having the cavity, the high-porosity section has low thermal conductivity. Such a cavity can be formed, for example, by not completely melting the powder made of the metallic material for forming the casing.

According to a third aspect of the present invention, in the rotating machine according to the first aspect, powder made of the metallic material may be present in the high-porosity section.

By causing the powder made of the metallic material for forming the casing to be present in the high-porosity section, the density of the high-porosity section can be decreased and the porosity can be increased. Such a powder can be present in a powder form in the casing, for example, by not completely melting the metallic material for forming the casing.

According to a fourth aspect of the present invention, in the rotating machine according to the first aspect, the high-porosity section may be provided at a plurality of positions spaced apart in a circumferential direction of the central axis.

In this way, when the high-porosity section is partially provided spaced apart in the circumferential direction rather than all around the circumference of the casing, thermal conductivity can be suppressed by the high-porosity section. The section other than the high-porosity section is formed by the main section having a porosity lower than the high-porosity section and the strength of the cover of the casing can be secured.

According to a fifth aspect of the present invention, in the rotating machine according to the first aspect, the rotating machine may be a turbocharger, the casing may be a compressor casing of the turbocharger, and the high-porosity section may be formed between a scroll flow passage formed in the compressor casing and an inlet flow passage.

Thus, it is possible to suppress the heat of the air, which rises in temperature and pressure by the impeller, from being transmitted to the inlet flow passage side from the scroll flow passage on the outlet side of the compressor. As a result, the suction temperature rise at the inlet side of the compressor is suppressed, and it is possible to suppress the reduction in the pressure ratio and the reduction in efficiency of the compressor.

According to a sixth aspect of the present invention, in the rotating machine according to the first aspect, the rotating machine may be a turbocharger, the casing may be a turbine casing of the turbocharger, and the high-porosity section may be formed on an outer circumferential section of the turbine casing.

Thus, it is possible to suppress the heat of the exhaust gas passing through the turbine casing from being released through the turbine casing, by the high-porosity section. Furthermore, by increasing the porosity only on the outer circumferential side of the turbine casing, it is possible to maintain the oxidation resistance of the inner surface of the turbine casing exposed to the high temperature gas.

According to a seventh aspect of the present invention, there is provided a method for manufacturing the casing for the rotating machine, the method including: forming the casing, by repeating a step of forming a material powder layer by spreading a material powder made of a metallic material for forming the casing, and a step of irradiating a melting beam to melt the material powder, and in the step of melting the material powder, a high-porosity section having a porosity higher than that of the remaining section of the casing is formed in a part of the casing, by adjusting at least one of an output of the melting beam, a beam scanning speed, and a beam scanning line width.

In this way, it is possible to form a casing including a main section made of a metallic material and a high-porosity section having a porosity higher than that of the main section. In such a casing, since the porosity of the high-porosity section is high, the thermal conductivity partially decreases. By providing such a high-porosity section, it is possible to maintain necessary rigidity by the main section, while partially controlling the thermal conductivity of the casing.

Advantageous Effects of Invention

According to the rotating machine and the method for manufacturing the casing for the rotating machine, it is possible to suppress the heat transfer via the casing and to improve the performance of the rotating machine.

DESCRIPTION OF EMBODIMENTS

First Embodiment

Next, a rotating machine and a method for manufacturing a casing for the rotating machine according to a first embodiment of the present invention will be described with reference to the drawings.

Figure 1:
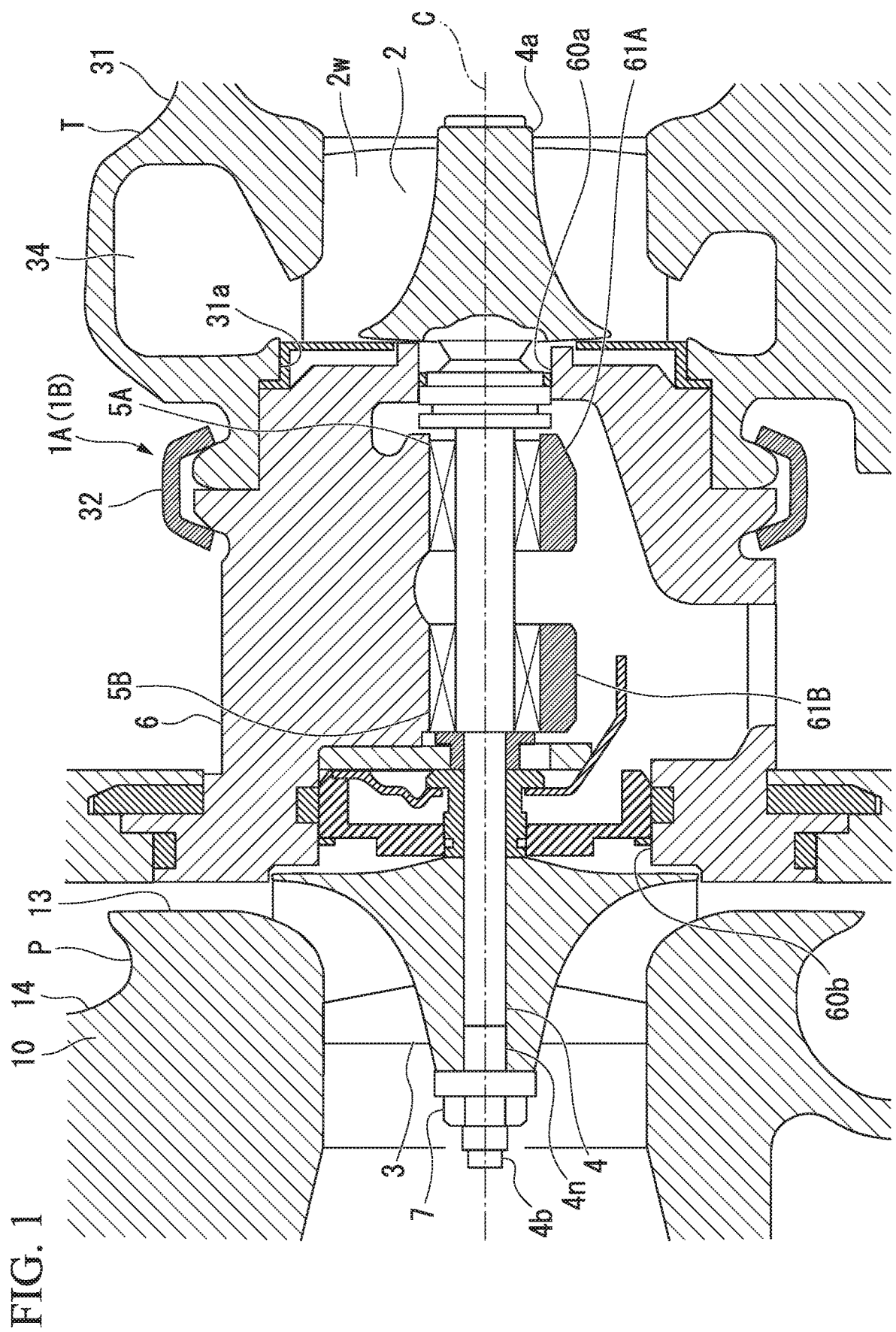
FIG. 1 is a cross-sectional view of a turbocharger according to first and second embodiments of the present invention.

FIG. 1 is a cross-sectional view of a turbocharger according to a first embodiment of the present invention.

As shown in FIG. 1, a turbocharger (a rotating machine) A includes a turbine wheel 2, a compressor wheel (impeller) 3, a rotating shaft (rotating body) 4, journal bearings 5A and 5B, and a bearing housing 6. The turbocharger 1A is mounted, for example, in an automobile or the like as an auxiliary machine of an engine in such a posture that the rotating shaft 4 extends in a horizontal direction. Here, an alternate long and short dashed line shown in FIG. 1 indicates a central axis C of the rotating shaft 4.

In the turbocharger 1A, the turbine wheel 2 provided in a turbine T rotates about the central axis C by the exhaust gas flow supplied from an engine (not shown) to the turbine T.

The rotating shaft 4 and the compressor wheel 3 rotate about the central axis C in accordance with the rotation of the turbine wheel 2.

The bearing housing 6 is supported by a vehicle body or the like via a bracket (not shown), a compressor P, the turbine T, and the like. The bearing housing 6 has bearing accommodating sections 61A and 61B for accommodating the journal bearings 5A and 5B therein. The bearing housing 6 has an opening 60a at one end side thereof and an opening 60b at the other end side thereof. The rotating shaft 4 is supported by the journal bearings 5A and 5B accommodated in the bearing accommodating sections 61A and 61B so as to be rotatable around the central axis C. A first end section 4a and a second end section 4b of the rotating shaft 4 protrude to the outside of the bearing housing 6 through the openings 60a and 60b. That is, a part of the rotating shaft 4 in a length direction along the central axis C is accommodated in the bearing housing 6.

The turbine wheel 2 is provided on a first side (a right side in FIG. 1) of the bearing housing 6 in an axial direction in which the central axis C extends, and the compressor wheel 3 is provided on a second side (a left side in FIG. 1) of the bearing housing 6. More specifically, the turbine wheel 2 is provided integrally with the first end section 4a of the rotating shaft 4, and the compressor wheel 3 is coupled by screwing a nut 7 onto a screw section 4n formed at the second end section 4b of the rotating shaft 4. The turbine wheel 2 and the compressor wheel 3 rotate about the central axis C integrally with the rotating shaft 4.

The compressor P includes a compressor wheel 3 and a compressor casing (casing) 10.

The compressor wheel 3 is a so-called impeller, which centrifugally compresses air by rotation of the rotating shaft 4. More specifically, the air (intake air) flowing in from the second side in the direction in which the central axis C extends rises in pressure and temperature, and is sent to a diffuser 13 formed outwardly in a radial direction.

Figure 2:
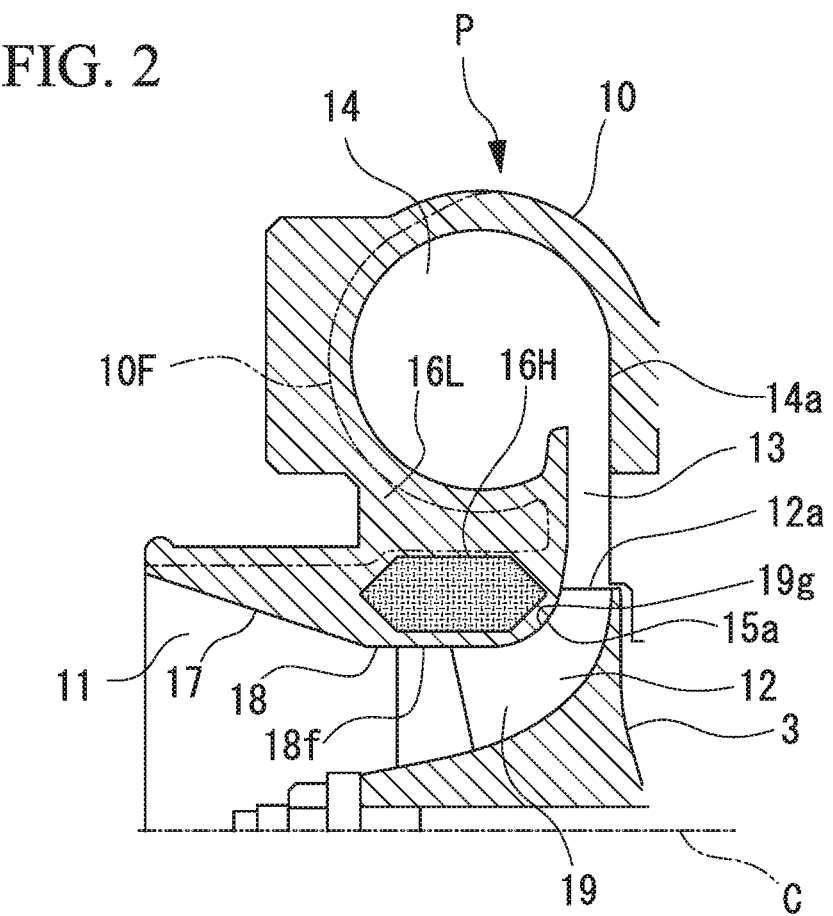
FIG. 2 is a cross-sectional view of a compressor according to the first embodiment of the present invention.

FIG. 2 is a cross-sectional view of the compressor according to the first embodiment of the present invention.

As shown in FIG. 2, the compressor casing 10 forms a wheel inlet flow passage (an inlet flow passage) 11, a wheel flow passage 12, the diffuser 13, and a scroll 14.

The wheel inlet flow passage 11 is formed, for example, between an intake pipe (not shown) extending from an air cleaner box or the like and the wheel flow passage 12. The wheel inlet flow passage 11 includes an inclined section 17 in which the cross-sectional area of the flow passage gradually decreases toward the compressor wheel 3, and a general section 18 which is disposed on a side closer to the compressor wheel 3 than the inclined section 17 and in which a cross-sectional shape of the flow passage does not change.

The wheel flow passage 12 includes a space which accommodates the compressor wheel 3. This wheel flow passage 12 and the compressor wheel 3 form a flow passage through which compressed air flows. In other words, the wheel flow passage 12 can also be referred to as an accommodating chamber which accommodates the compressor wheel 3. In the wheel flow passage 12, a slight gap is formed between a blade section 19 of the compressor wheel 3 and the compressor casing 10. That is, a curved surface 15a is formed along an outer edge 19g of the blade section 19 at a position of the compressor casing 10 facing the blade section 19. As a result, the wheel flow passage 12 is formed to be curved so that a diameter gradually increases from the side close to the wheel inlet flow passage 11 toward the turbine T side and an increase rate of the diameter expansion gradually increases.

The diffuser 13 extends radially outward from an outermost circumferential section 12a of the wheel flow passage 12, with the central axis C as the center. The diffuser 13, for example, converts kinetic energy of the air compressed by the compressor wheel 3 into pressure energy. The diffuser 13 connects the wheel inlet flow passage 11 and the scroll 14.

The scroll 14 further converts the kinetic energy of the air flowing in from the diffuser 13 into pressure energy and discharges the air to the outside of the compressor casing 10. The air discharged via the scroll 14 is supplied to a cylinder or the like of an engine (not shown). The scroll 14 is formed in a circular shape in the cross section shown in FIG. 2, and connected to the diffuser 13 at an end section 14a on the side closest to the turbine T. The scroll 14 is formed at a position overlapping the compressor wheel 3 in the direction in which the central axis C extends, and extends in a circumferential direction around the central axis C. The cross-sectional area of the scroll 14 thus formed is gradually enlarged toward a discharge port (not shown) of the compressor P.

Figure 3:
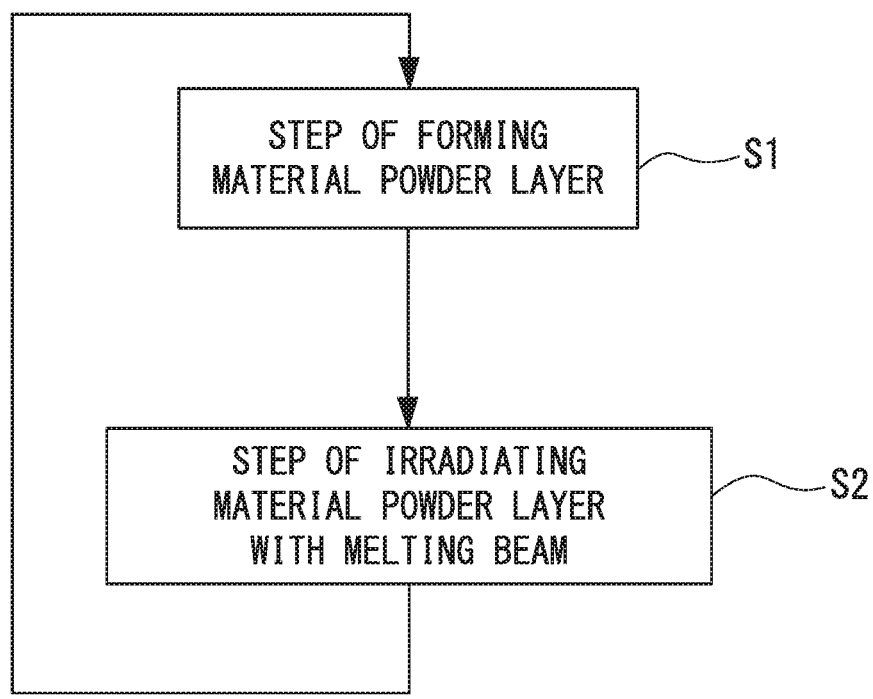
FIG. 3 is a flowchart of a method of manufacturing a casing for a rotating machine according to the first embodiment of the present invention.

FIG. 3 is a flow chart of a method of manufacturing the casing for the rotating machine according to a first embodiment of the present invention.

The compressor casing 10 is formed by a metal lamination method, using a metallic material such as an aluminum alloy.

As shown in FIG. 3, the metal lamination method sequentially repeats a step S1 of spreading the material powder to a predetermined thickness to form a material powder layer, and a step S2 of irradiating the material powder layer with a melting beam.

In step S1 of forming the material powder layer, the material powder layer is formed by spreading a material powder made of a metallic material such as aluminum alloy for forming the compressor casing 10 to a predetermined thickness of, for example, 30 to 50 μm.

In step S2 of irradiating the material powder with the melting beam, the material powder layer is irradiated with the melting beam having energy for melting the material powder such as a laser beam and an electron beam. By being irradiated with the melting beam, the material powder melts. When the irradiation with the melting beam is stopped, the material powder is cooled and solidified to form a metal layer. The irradiation range to the material powder layer with the melting beam is set to be in a range corresponding to the cross-sectional shape of the compressor casing 10.

When the step S1 of forming the material powder layer and the step S2 of irradiating the material powder with the melting beam are performed for one cycle, the metal layer forming a part of the compressor casing 10 is formed to have a predetermined thickness. By sequentially repeating the step S1 of forming the material powder layer and the step S2 of irradiating the melting beam, and by sequentially changing the irradiation range with the melting beam in accordance with the cross-sectional shape of the compressor casing 10, a plurality of metal layers are sequentially laminated to form the compressor casing 10 having a predetermined shape.

As shown in FIG. 2, a high-porosity section 16H is formed in a part of the compressor casing 10.

The high-porosity section 16H suppresses heat transfer from the wheel flow passage 12, the diffuser 13 and the scroll 14 to the wheel inlet flow passage 11. The high-porosity section 16H is, for example, formed continuously in the circumferential direction on the outer circumferential side of the general section 18 of the wheel inlet flow passage 11. The high-porosity section 16H is not exposed to an inner circumferential surface 18f of the general section 18, but is formed in a region on the outer circumferential side of the inner circumferential surface 18f by a predetermined dimension.

In the compressor casing 10, the high-porosity section 16H is formed so that the porosity thereof is higher than in a low-porosity section (the main section, and the remaining section) 16L which forms a section other than the high-porosity section 16H.

When the compressor casing 10 is formed by the aforementioned metal lamination method, the low-porosity section 16L and the high-porosity section 16H can be formed, by adjusting the output, the beam scanning speed, the beam scanning line width and the like of the melting beam irradiated in the step of irradiating the material powder with the melting beam, when the compressor casing 10 is formed by the metal lamination method.

For example, if the output of the melting beam is set such that the material powder layer made of the spread material powder is completely melted, the material powder is cooled and solidified after completely melted, and the low-porosity section 16L having a porosity smaller than 5% is formed.

For example, when the output of the melting beam is set, for example, to be weak such that the spread material powder is not completely melted but a part thereof remains in an unmelted state, the high-porosity section 16H having a porosity of, for example, 5% or more is formed.

In the high-porosity section 16H, for example, only the surface of the material powder may be melted and the inner side rather than the surface may be in an unmelted state. In this way, since the surface of the high-porosity section 16H is melted, while maintaining the shape of each material powder, the high-porosity section 16H can be formed in a porous shape in which a large number of cavities are formed between the material powders, while a plurality of material powders are bound to each other.

Here, in the aforementioned high-porosity section 16H, the material powder may remain completely unmelted, that is, remain as the material powder. For this purpose, for example, a section for forming the surrounding low-porosity section 16L is irradiated with a melting beam, a section for forming the high-porosity section 16H is not irradiated with the melting beam, and the material powder remains unmelted.

In such a metal lamination method, a molten metallic material (molten metal) is not poured into a metal mold as in the casting or the die casting method. In the case of a mold, in order to secure the flowability of the molten metal, there is a need for at least, for example, an approximate 4 mm mold frame recess into which the molten metal is poured. In contrast, in the metal lamination method, since the material powder may spread and the melting beam may be irradiated, it is possible to make the thickness 4 mm or less.

Therefore, as shown by a two-dot chain line in FIG. 2, for example, an outer circumferential wall 10F of the compressor casing 10 can be reduced in thickness.

By reducing the thickness of the outer circumferential wall 10F of the compressor casing 10 for forming the scroll 14 in this manner, it is possible to promote heat radiation of the compressed air whose temperature and pressure have been increased by the rotation of the compressor wheel 3. Furthermore, the temperature of the metal of the compressor casing 10 on the side close to the turbine T rises due to the influence of the radiation. However, in the compressor casing 10, by reducing the thickness of the outer circumferential wall 10F facing the side opposite to the turbine T, the heat radiation effect can be promoted.

Further, in this way, the outer circumferential surface of the wheel flow passage 12 may be reduced in thickness at a plurality of positions spaced apart from each other in the circumferential direction.

Therefore, according to the above-described first embodiment, the compressor casing 10 includes a low-porosity section 16L and a high-porosity section 16H formed of a metallic material. With such a configuration, since the high-porosity section 16H has high porosity in contrast to the low-porosity section 16L of the compressor casing 10, the thermal conductivity decreases. By partially providing the high-porosity section 16H, it is possible to maintain necessary rigidity by the low-porosity section 16L, while partially controlling the thermal conductivity of the compressor casing 10.

As a result, heat transfer through the compressor casing 10 can be suppressed, and the performance of the turbocharger 1A can be improved.

Furthermore, according to the first embodiment, the high-porosity section 16H can have a cavity. As a result, the high-porosity section 16H has low thermal conductivity.

Further, the high-porosity section 16H can be set such that powder made of a metallic material is present. As a result, the high-porosity section 16H has low density, high porosity, and low thermal conductivity.

The high-porosity section 16H as described above may be formed at least in an unmelted state of the material powder at the time of irradiation with the melting beam and can be easily formed.

Further, the high-porosity section 16H is formed between the scroll 14 and the wheel inlet flow passage 11 in the compressor casing 10 of the compressor P. As a result, it is possible to suppress the heat of the air, in which the temperature and pressure increases by the compressor wheel 3, from being transmitted to the wheel inlet flow passage 11 side from the scroll 14 on the outlet side of the compressor P. As a result, an increase in the suction temperature at the inlet side of the compressor P is suppressed, and it is possible to suppress a reduction in pressure ratio and a decrease in efficiency of the compressor P.

Furthermore, by forming the compressor casing 10 using the metal lamination method, the compressor casing 10 can be reduced in thickness as compared with the case where the compressor casing 10 is formed by the casting or the die casting.

In this way, by reducing the thickness of the compressor casing 10, it is possible to promote heat radiation of the air which is increased in temperature by the compressor wheel 3.

Furthermore, while the temperature of the surface metal rises under the influence of radiation on the side of the compressor casing 10 close to the turbine T, by reducing the thickness of the outer circumferential wall 10F of the compressor casing 10 on the side opposite to the turbine T, the heat radiation effect can be promoted.

First Modified Example of First Embodiment

In the first embodiment, the high-porosity section 16H is formed on the outer circumferential side of the general section 18 of the wheel inlet flow passage 11, but it is not limited thereto.

Figure 4:
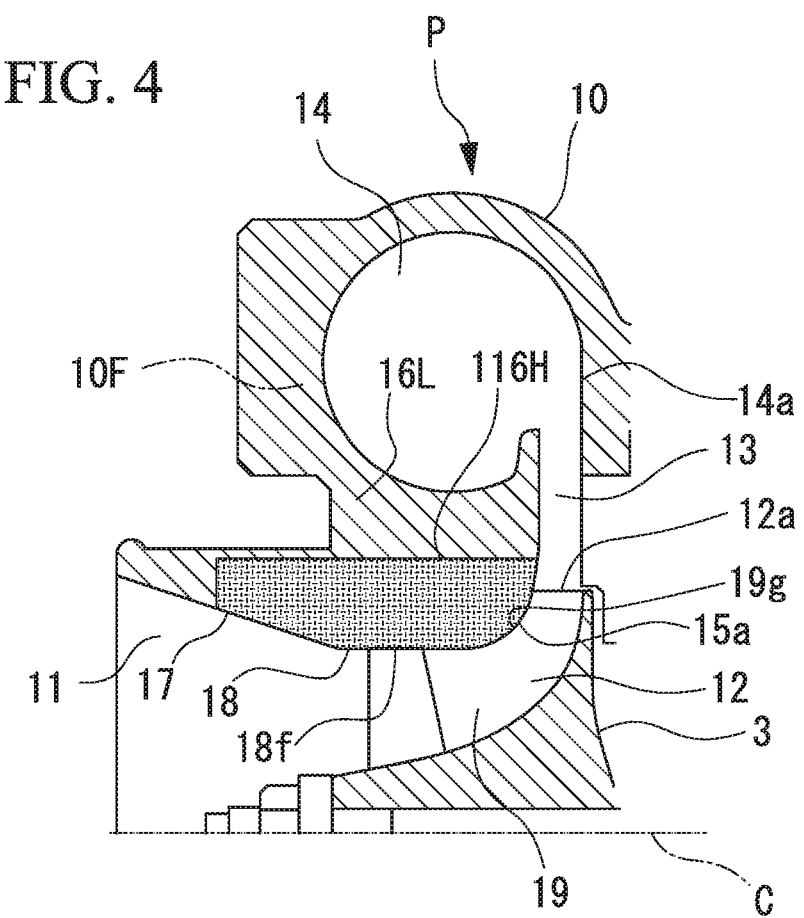
FIG. 4 is a cross-sectional view corresponding to FIG. 2 in a first modified example of the first embodiment of the present invention.

FIG. 4 is a cross-sectional view corresponding to FIG. 2 in a first modified example of the first embodiment of the present invention.

For example, as shown in FIG. 4, a high-porosity section 116H may continuously form the wheel inlet flow passage 11 and the wheel flow passage 12, and the wheel inlet flow passage 11 includes the inclined section 17 and the general section 18 of the compressor casing 10.

With such a configuration, heat conduction from the wheel flow passage 12, the diffuser 13, and the scroll 14 to the wheel inlet flow passage 11 is more effectively suppressed by the high-porosity section 116H.

Second Modified Example of First Embodiment

In the first embodiment, as shown in FIGS. 2 and 4, the high-porosity sections 16H and 116H are formed continuously around the entire circumference in the circumferential direction, but the configuration is not limited thereto. For example, the high-porosity sections 16H and 116H may be provided at a plurality of positions spaced apart in the circumferential direction.

Second Embodiment

Next, a second embodiment of the present invention will be described with reference to the drawings. In the description of the second embodiment, the same reference numerals are used for the same parts as in the first embodiment, while referring to FIG. 1. Further, a detailed description of the overall configuration of the turbocharger that is common to the configuration described in the first embodiment will not be provided.

As shown in FIG. 1, a turbocharger (rotating machine) 1B includes a turbine wheel 2, a compressor wheel 3, a rotating shaft 4, journal bearings 5A and 5B, and a bearing housing 6.

The turbine T includes a turbine casing (casing) 31 which accommodates the turbine wheel 2. The turbine casing 31 is attached to one end side of the bearing housing 6 via a mounting bracket 32. The turbine casing 31 has an opening 31a at a position facing the bearing housing 6. A turbine wheel 2 having a plurality of turbine blades 2w in a circumferential direction is accommodated in the opening 31a.

Figure 5:
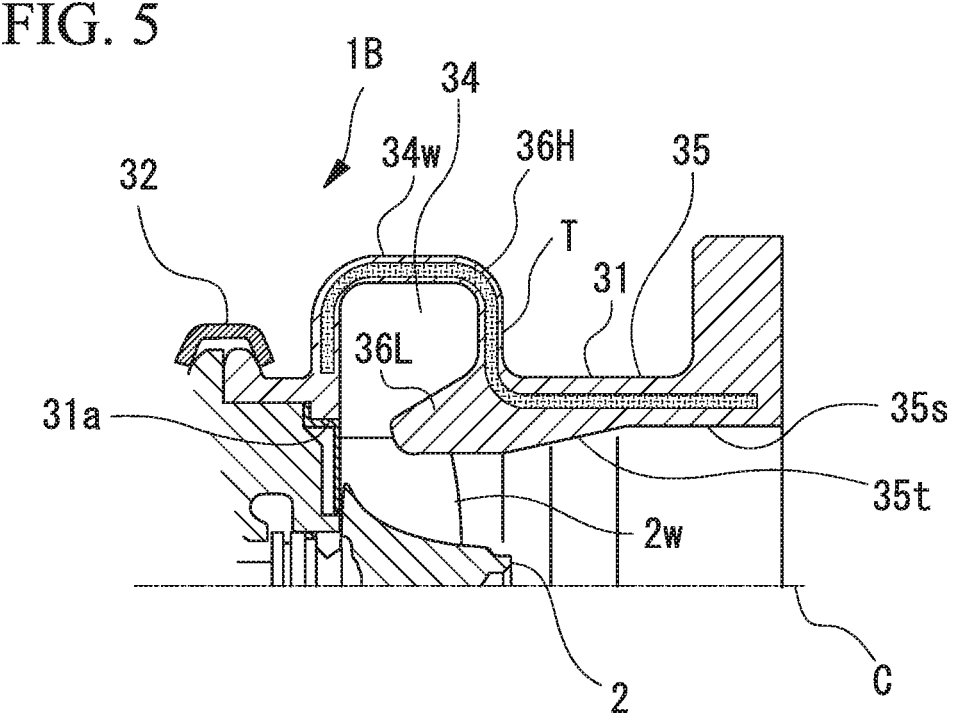
FIG. 5 is a cross-sectional view of a turbine according to a second embodiment of the present invention.

FIG. 5 is a cross-sectional view of the turbine according to the second embodiment of the present invention.

As shown in FIG. 5, the turbine casing 31 includes a gas introduction section (not shown), a scroll flow passage 34, and an exhaust section 35.

The gas introduction section (not shown) sends a part of the exhaust gas discharged from the engine (not shown) into the turbine casing 31.

The scroll flow passage 34 is continuously formed in the circumferential direction to surround the outer circumferential side of the turbine wheel 2, continuously with the gas introduction section (not shown). The scroll flow passage 34 is provided at least in a part in the circumferential direction thereof to face the outer circumferential section of the turbine wheel 2, and forms a flow passage through which the exhaust gas for rotationally driving the turbine wheel 2 flows.

The exhaust gas flowing in from the gas introduction section 33 flows on the outer circumferential side of the turbine wheel 2 along the scroll flow passage 34 in the circumferential direction. When the exhaust gas flowing along the circumferential direction in this way hits the turbine blade 2w of the turbine wheel 2, the turbine wheel 2 is rotationally driven. The flow direction of the exhaust gas changes by hitting the turbine blades 2w on the outer circumferential side of the turbine wheel 2. The exhaust gas in which the flow direction changes by the turbine blade 2w is discharged into the exhaust section 35 from the inner circumferential side of the turbine wheel 2.

The exhaust section 35 is formed in a cylindrical shape which continues along the central axis C in a direction away from the bearing housing 6. The exhaust section 35 has a tapered section 35t in which an inner diameter gradually increases as it goes away from the bearing housing 6, and a straight section 35s provided on the downstream side of the tapered section 35t and having a constant inner diameter. The exhaust gas flows in the exhaust section 35 in a direction away from the bearing housing 6 along the central axis C.

In a part of the turbine casing 31, a high-porosity section 36H is formed. Such a high-porosity section 36H is formed continuously, for example, over an outer circumferential wall section 34w of the scroll flow passage 34 and the tapered section 35t and the straight section 35s of the exhaust section 35. The high-porosity section 36H is formed continuously in the circumferential direction of the turbine casing 31. The high-porosity section 36H is formed so as not to be exposed to the outer circumferential surface 31f and the inner circumferential surface 31g of the turbine casing 31.

The high-porosity section 36H suppresses heat conduction from the outer circumferential surface of the turbine casing 31 to the outside. In the turbine casing 31, the high-porosity section 36H is formed to have a porosity higher than a low-porosity section (main section) 36L that forms a portion other than the high-porosity section 36H.

The low-porosity section 36L and the high-porosity section 36H can be formed by the above-described metal lamination method. When being formed by the metal lamination method, in the step of irradiating the material powder with the melting beam, the low-porosity section 36L and the high-porosity section 36H can adjust the output of the melting beam to be irradiated, the beam scanning speed, and the beam scanning line width.

In the method of manufacturing the rotating machine and the casing for the rotating machine of this embodiment, since the high-porosity section 36H has high porosity in contrast to the low-porosity section 36L of the turbine casing 31, the thermal conductivity decreases. By partially providing such a high-porosity section 36H, it is possible to maintain the required rigidity by the low-porosity section 36L, while partially controlling the thermal conductivity of the turbine casing 31.

As a result, heat transfer through the turbine casing 31 can be suppressed, and the performance of the turbocharger 1B can be improved.

The high-porosity section 36H can be formed on the outer circumferential section of the turbine casing 31. Here, the outer circumferential section of the turbine casing 31 is, for example, a portion on the outer side (an outer circumferential side) rather than the center of the turbine casing 31 in the thickness direction. By forming the high-porosity section 36H in this manner, it is possible to suppress the heat of the exhaust gas passing through the turbine casing 31 from being released through the turbine casing 31. Further, by forming the high-porosity section 36H having high porosity only on the outer circumferential section of the turbine casing 31, it is possible to maintain the oxidation resistance of the inner surface of the turbine casing 31 exposed to the high temperature gas. Furthermore, since it is possible to suppress heat of the exhaust gas from being released, it is possible to send the exhaust gas having a higher temperature to the catalyst provided downstream of the exhaust section 35. Since the catalyst has temperature dependence, by suppressing the temperature decrease of the exhaust gas temperature, it is possible to make the catalyst function more efficiently.

First Modified Example of Second Embodiment

In the above-described second embodiment, the description has been given for the case in which the high-porosity section 36H is continuously formed over the outer circumferential wall section 34w of the scroll flow passage 34 and the tapered section 35t and the straight section 35s of the exhaust section 35 has been described, but is not limited to this configuration.

Figure 6:
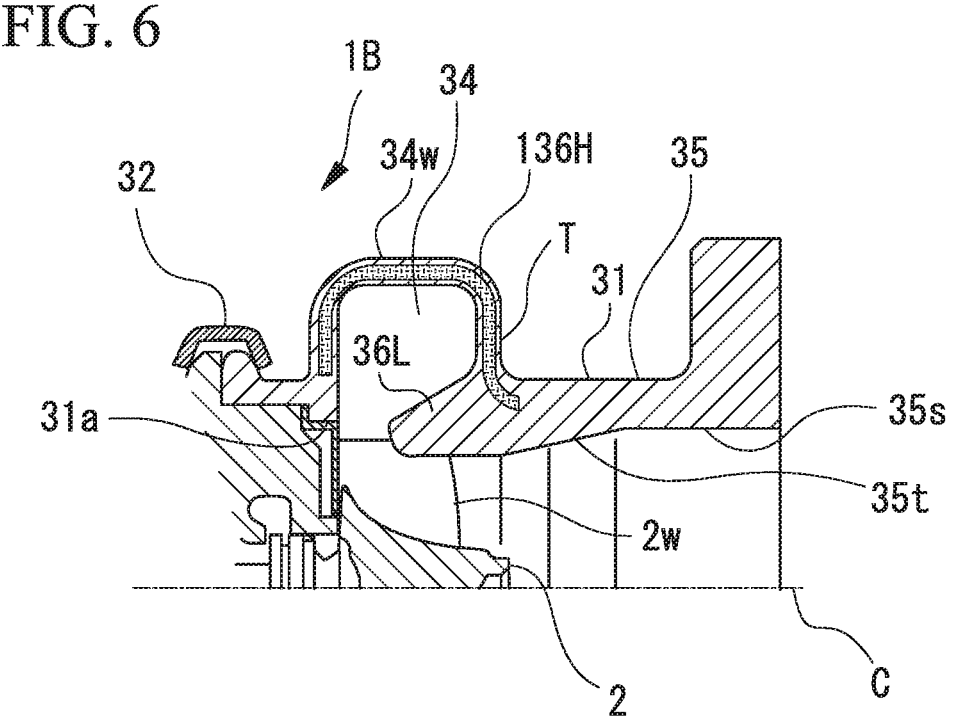
FIG. 6 is a cross-sectional view corresponding to FIG. 5 in the first modified example of the second embodiment of the present invention.

FIG. 6 is a cross-sectional view corresponding to FIG. 5 in the first modified example of the second embodiment of the present invention.

As shown in FIG. 6, the high-porosity section 136H may be formed, for example, only on the outer circumferential wall section 34w of the scroll flow passage 34. More specifically, the high-porosity section 136H may be formed only on the scroll flow passage 34 of the turbine casing 31, without being formed in the exhaust section 35 or the like.

According to the first modified example, when the high-porosity section 136H is formed on the outer circumferential wall section 34w of the scroll flow passage 34, it is possible to suppress the exhaust gas flowing through the scroll flow passage 34 from being released via the outer circumferential wall section 34w of the scroll flow passage 34. As a result, it is possible to suppress the temperature decrease of the exhaust gas sent to the turbine wheel 2, and to suppress the reduction in output of the turbine T.

Second Modified Example of Second Embodiment

Figure 7:
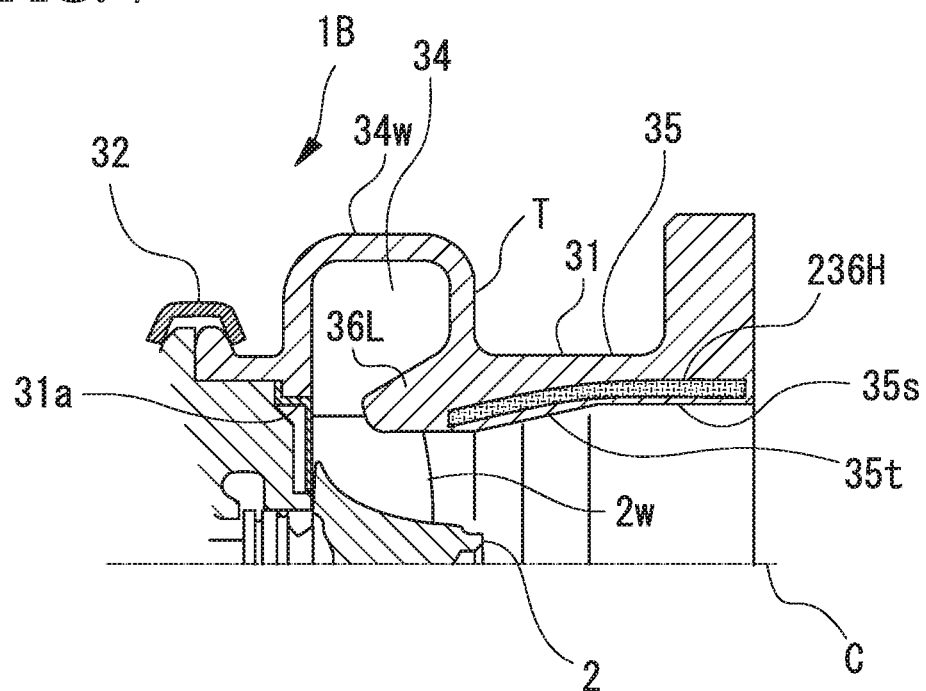
FIG. 7 is a cross-sectional view corresponding to FIG. 5 in a second modified example of the second embodiment of the present invention.

FIG. 7 is a cross-sectional view corresponding to FIG. 5 in a second modified example of the second embodiment of the present invention.

As shown in FIG. 7, a high-porosity section 236H may be provided, for example, only on the tapered section 35t and the straight section 35s of the exhaust section 35.

According to the second modified example, it is possible to suppress the heat of the exhaust gas flowing through the exhaust section 35 from being released via the exhaust section 35. As a result, exhaust gas having a higher temperature can be sent to the catalyst provided on the downstream side of the exhaust section 35. As a result, the catalyst can function more efficiently.

Second Modified Example of Second Embodiment

In FIGS. 5 to 7, the description has been of a case in which the high-porosity sections 36H, 136H and 236H are formed circumferentially continuously around the entire circumference. However, the present invention is not limited to this configuration. For example, the high-porosity sections 36H, 136H and 236H may be provided at a plurality of positions spaced apart in the circumferential direction.

Other Embodiments

The present invention is not limited to the above-described embodiments, and the design can be changed within the scope that does not depart from the gist of the present invention.

In the above-described first embodiment, the description has been provided of the case in which the high-porosity section 16H has cavity in which the powder made of a metallic material is present in an unmelted state. However, in the high-porosity section 16H, the powder may be removed from the cavity. In this case, it is possible to remove the powder by forming holes or the like for powder removal in the casing.

Furthermore, in the above-described embodiment, an open type impeller has been described as an example. However, the impeller is not limited to the open type impeller, but may be, for example, a closed type impeller integrally including a cover part.

Further, the turbochargers 1A and 1B have been described as examples of rotating machines. However, the rotating machine is not limited to a turbocharger, but may be, for example, a supercharger, a turbine engine or the like.

INDUSTRIAL APPLICABILITY

The present invention can be applied to a rotating machine and a method of manufacturing the casing for the rotating machine. According to the present invention, heat transfer through the casing can be suppressed and the performance of the rotating machine can be improved.

REFERENCE SIGNS LIST 1A, 1B Turbocharger (rotating machine)
2 Turbine Wheel
2w Turbine blade
3 Compressor wheel
4 Rotating shaft (rotating body)
4a First end section
4b Second end section
4n Screw section
5A, 5B journal bearing
6 Bearing housing
7 Nut
10 Compressor casing (casing)
10F Outer circumferential wall
11 Wheel inlet flow passage (inlet flow passage)
12 Wheel flow passage
12a Outermost circumferential section
13 Diffuser
14 Scroll
14a End section
15a Curved surface
16H, 36H, 116H, 136H, 236H high-porosity section
16L, 36L Low-porosity section (main section, remaining section)
17 Inclined section
18 General section
18f Inner circumferential surface
19 Blade section
19g Outer edge
31 Turbine casing (casing)
31a Opening
31f Outer circumferential surface
31g Inner circumferential surface
32 Mounting bracket
34 Scroll flow passage
34w Outer circumferential wall section
35 Exhaust section
35s Straight section
35t Tapered section
60a, 60b Opening
61A, 61B Bearing accommodating section
C Central axis
P Compressor
T Turbine

What is claimed is:

1. A rotating machine comprising:
   a rotating body configured to rotate around a central axis, and
   a casing configured to accommodate at least a part of the rotating body,
   wherein the casing includes a main section made of a metallic material, and a high-porosity section made of the same material as the main section and having a porosity higher than the main section.

2. The rotating machine according to claim 1, wherein the high-porosity section has a cavity.

3. The rotating machine according to claim 1, wherein powder made of the metallic material is present in the high-porosity section.

4. The rotating machine according to claim 1, wherein the high-porosity section is provided at a plurality of positions spaced apart in a circumferential direction of the central axis.

5. The rotating machine according to claim 1, wherein the rotating machine is a turbocharger,
   the casing is a compressor casing of the turbocharger, and
   the high-porosity section is formed between a scroll flow passage formed in the compressor casing and an inlet flow passage.

6. The rotating machine according to claim 1, wherein the rotating machine is a turbocharger,
   the casing is a turbine Casing, of the turbocharger, and
   the high-porosity section is formed on an outer circumferential section of the turbine casing.

7. A method for manufacturing the casing for the rotating machine according to claim 1, the method comprising:
   forming the casing, by repeating a step of forming a material powder layer by spreading a material powder made of a metallic material for forming the casing, and a step of irradiating the metal powder with a inciting beam to melt the material powder; and
   wherein, in the step of melting the material powder, a high-porosity section having a porosity higher than that of the remaining section of the casing is formed in a part of the casing, by adjusting at least one of an output of the melting beam, a beam scanning speed, and a beam scanning line width.

* * * * *